United States Patent
Youn et al.

(10) Patent No.: US 10,727,702 B2
(45) Date of Patent: Jul. 28, 2020

(54) WIRELESS POWER TRANSMISSION APPARATUS AND METHOD THEREFOR

(71) Applicant: LG ELECTRONICS INC., Seoul (KR)

(72) Inventors: Jinho Youn, Seoul (KR); Hyokune Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 16/311,976

(22) PCT Filed: Jul. 3, 2017

(86) PCT No.: PCT/KR2017/007020
§ 371 (c)(1),
(2) Date: Dec. 20, 2018

(87) PCT Pub. No.: WO2018/008919
PCT Pub. Date: Jan. 11, 2018

(65) Prior Publication Data
US 2019/0207431 A1 Jul. 4, 2019

(30) Foreign Application Priority Data
Jul. 8, 2016 (KR) .................. 10-2016-0086961

(51) Int. Cl.
*H02J 50/30* (2016.01)
*H02J 50/90* (2016.01)
*G02B 6/06* (2006.01)
*H02J 7/02* (2016.01)
*H02J 50/60* (2016.01)
(Continued)

(52) U.S. Cl.
CPC ............... *H02J 50/30* (2016.02); *G01V 8/16* (2013.01); *G02B 6/06* (2013.01); *H01S 3/09* (2013.01); *H02J 7/02* (2013.01); *H02J 7/025* (2013.01); *H02J 50/60* (2016.02); *H02J 50/90* (2016.02)

(58) Field of Classification Search
CPC .. H02J 50/30; H02J 50/90; H02J 50/60; H02J 7/02; H02J 7/025; G01V 8/16; G02B 6/06
See application file for complete search history.

(56) References Cited

U.S. PATENT DOCUMENTS 4,187,506 A 2/1980 Dickinson

FOREIGN PATENT DOCUMENTS

JP 2011-512653 A 4/2011
KR 10-2002-0007117 A 1/2002
(Continued)

*Primary Examiner* — Robert L Deberadinis
(74) *Attorney, Agent, or Firm* — Birch, Stewart, Kolasch & Birch, LLP

(57) ABSTRACT

The present specification discloses a wireless power transmission apparatus and a method therefor. Herein, a wireless power transmission apparatus according to one embodiment of the present invention comprises: a laser light source unit; a light output unit for separating and outputting laser light generated in a laser light source into a first laser light for wireless charging and a second laser light for object detection; a light receiving unit for receiving the second laser light; and a light control unit for controlling the output of the first laser light through the second laser light received by the light receiving unit, wherein the light control unit may determine whether an object is detected or not according to the second laser light received by the light receiving unit.

10 Claims, 20 Drawing Sheets

(51) Int. Cl.
*G01V 8/16* (2006.01)
*H01S 3/09* (2006.01)

(56) References Cited

FOREIGN PATENT DOCUMENTS

KR 10-2006-0031887 A 4/2006
KR 10-2015-0039483 A 4/2015

FIG. 7
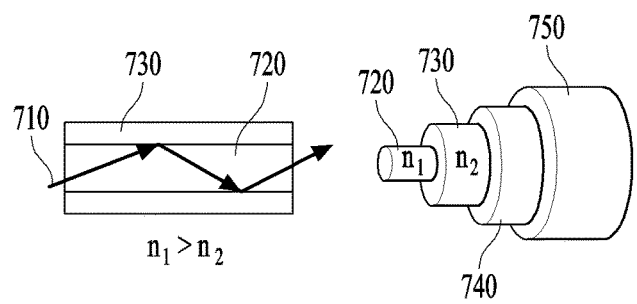 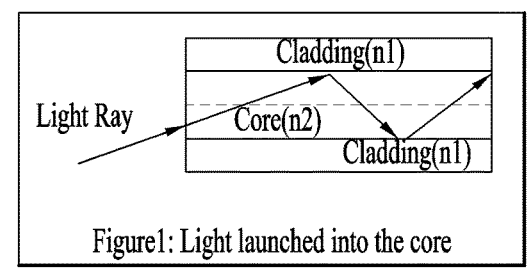
(a)                    (b)

FIG. 10
(a)
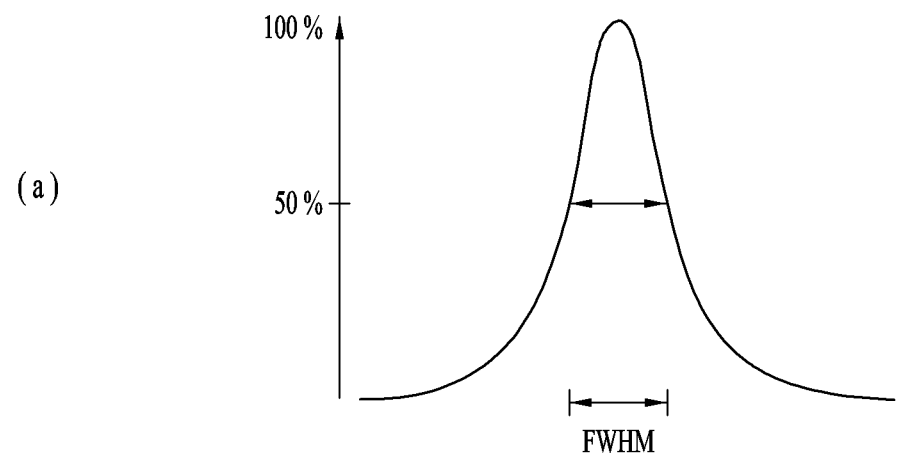
(b)
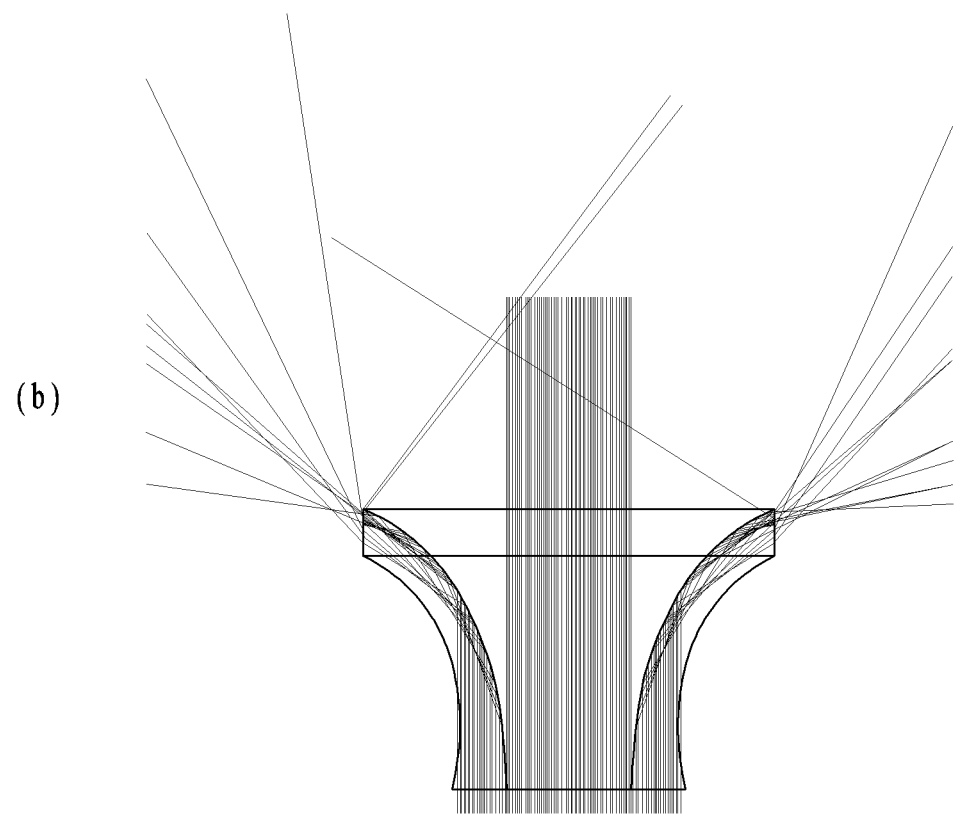

FIG. 11
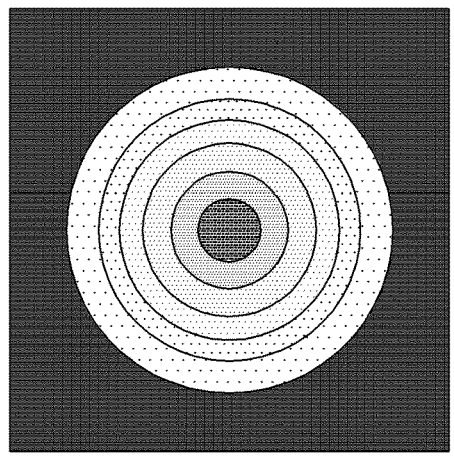
(a)
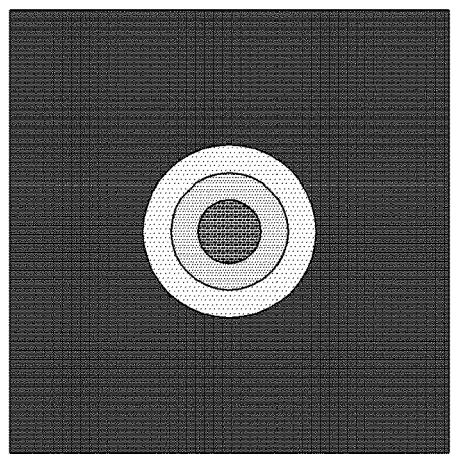
(b)
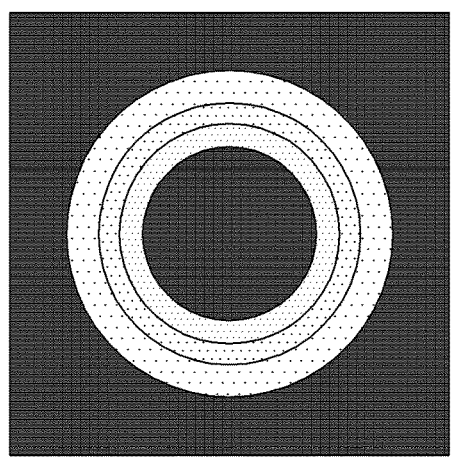
(c)

FIG. 13
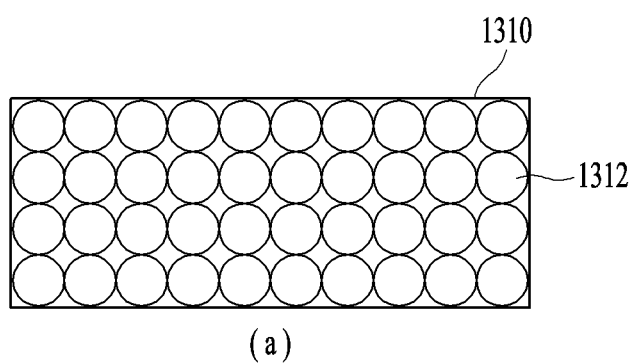
(a)
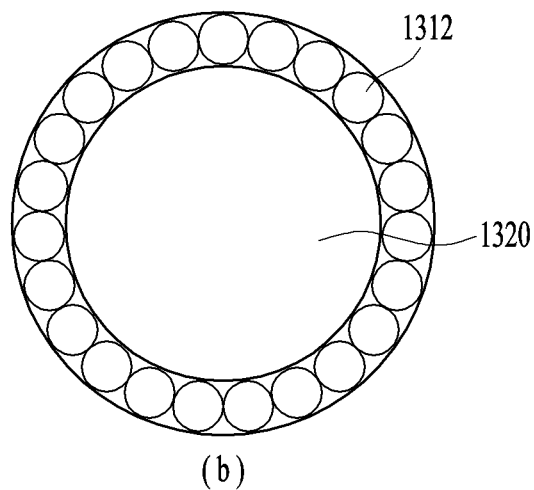
(b)
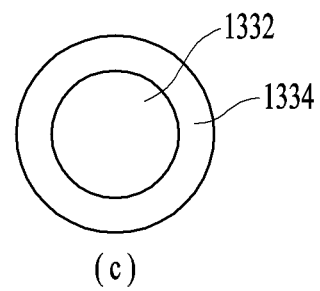
(c)

FIG. 14
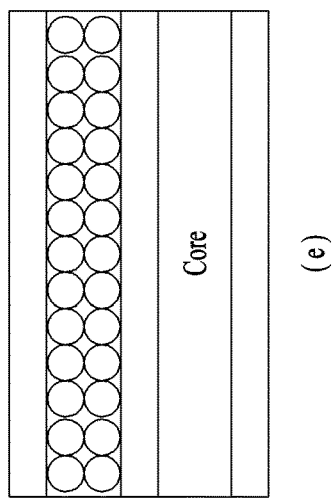
(a)
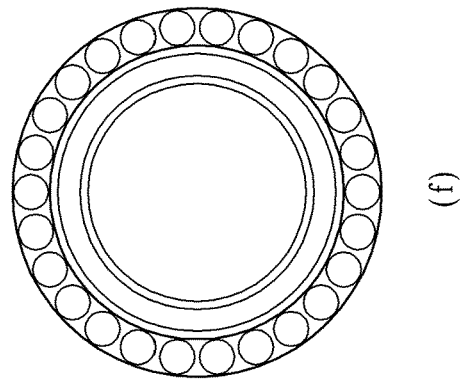
(b)
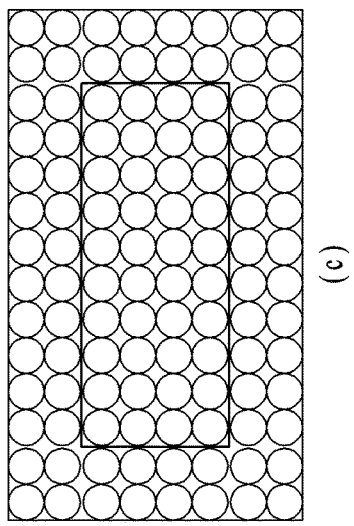
(c)
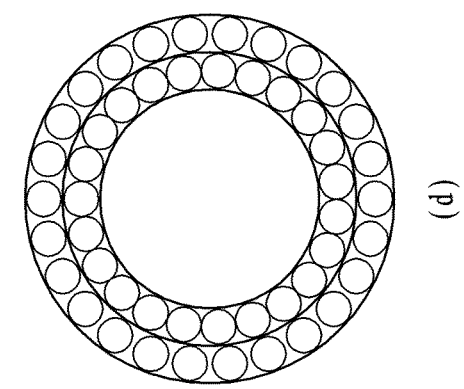
(d)
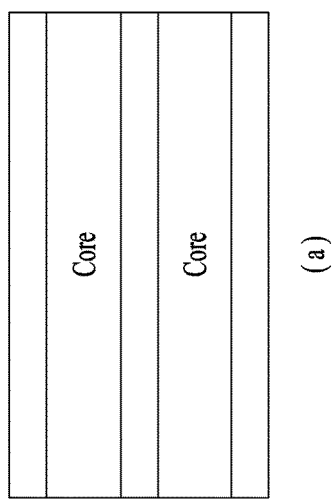
(e)
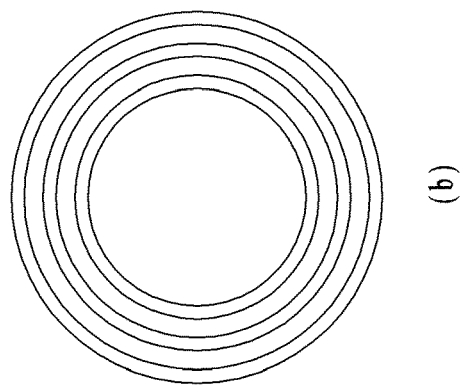
(f)

WIRELESS POWER TRANSMISSION APPARATUS AND METHOD THEREFOR

CROSS REFERENCE TO RELATED APPLICATIONS

This application is the National Phase of PCT International Application No. PCT/KR2017/007020, filed on Jul. 3, 2017, which claims priority under 35 U.S.C. 119(a) to Korean Patent Application No. 10-2016-0086961, filed in Republic of Korea on Jul. 8, 2016, all of which are hereby expressly incorporated by reference into the present application.

TECHNICAL FIELD

The present invention relates to a wireless power transmission device and a method therefor.

BACKGROUND ART

Recently, as a wireless power transmission technique is applied to wireless charging of a smartphone, the dissemination of the wireless power transmission technique is increasing. Study on the wireless power transmission technique is in active progress not only in wireless charging for electric vehicles, but also in such an application field as power supply for various wearable devices and IoT (Internet of Things) sensors.

The wireless power transmission technique corresponds to a technique that converts electric power into an electromagnetic wave form and forwards the energy without a wire on which electricity flows. In order to transmit power wirelessly, the wireless power transmission technique converts electric power into an electromagnetic wave corresponding to a high frequency electrical signal of a specific frequency or a light wave to forward energy.

The wireless power transmission technique is classified into a short distance wireless power transmission technique and a long distance wireless power transmission technique. The short distance wireless power transmission technique includes a self-induction scheme for transmitting power by creating an induced current in a nearby coil and a magnetic resonance scheme for transmitting power by matching resonant frequencies between a transmitting unit and a receiving unit. The long distance wireless power transmission technique includes a microwave scheme for transmitting power by converting power into a microwave and a laser scheme for transmitting power by converting power into a ray.

As mentioned in the foregoing description, the short distance wireless power transmission technique has matured as far as a first stage of development or a stage of commercialization of wireless charging of a smartphone and a related standard is under discussion. On the other hand, the study on the long distance wireless power transmission technique is in progress for an unmanned aerial vehicle of a special purpose such as a military purpose only. The maturity of the long distance wireless power transmission technique is less matured compared to the short distance wireless power transmission technique.

In particular, it is difficult to say that the wireless power transmission technique has entered a technologically completed stage. Since a related standard is not fully established or organized, commercialization has just started, and concern about harmfulness to human body compared to efficiency and convenience of wireless charging is recently reported, various problems are brought up.

DISCLOSURE OF THE INVENTION

Technical Tasks

Accordingly, the present invention is directed to an apparatus and method thereof that substantially obviate one or more problems due to limitations and disadvantages of the related art. A wireless power transmission apparatus and a method therefor are disclosed in the present invention.

One object of the present invention is to provide a wireless power transmission apparatus and a method therefor.

Another object of the present invention is to transmit wireless power using a separated laser.

Another object of the present invention is to perform wireless charging via wireless power transmission using a separated laser and secure or increase use safety via object detection.

The other object of the present invention is to provide a wireless power transmission apparatus structure of various forms for performing the abovementioned technical tasks.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

A wireless power transmission apparatus and a method therefor are disclosed in the present specification.

To achieve these and other advantages and in accordance with the purpose of the present invention, as embodied and broadly described, according to one embodiment, a wireless power transmission device includes a laser source, a light outputting unit configured to output a laser light generated in the laser source by dividing the laser light into a first laser light for performing wireless charging and a second laser light for detecting an object, a light receiving unit configured to receive the second laser light, and a light controlling unit configured to control an output of the first laser light via the second laser light received at the light receiving unit. The light controlling unit can determine whether or not an object is detected based on the second laser light received at the light receiving unit.

Technical solutions obtainable from the present invention may be non-limited by the above mentioned solutions. And, other unmentioned solutions can be clearly understood from the following description by those having ordinary skill in the technical field to which the present invention pertains.

Advantageous Effects

Accordingly, the present invention provides the following effects or advantages.

According to at least one of embodiments of the present invention, it is able to provide a wireless power transmission apparatus and a method therefor.

According to at least one of embodiments of the present invention, it is able to transmit wireless power using a separated laser.

According to at least one of embodiments of the present invention, it is able to perform wireless charging via wireless power transmission using a separated laser and secure or increase use safety via object detection.

According to at least one of embodiments of the present invention, it is able to provide a wireless power transmission apparatus structure of various forms for generating the abovementioned advantageous effects.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 7 is a diagram for explaining a structure and a principle of an optical fiber according to the present invention;

FIG. 10 is a diagram illustrating an emitting path of a laser light emitted through a light output unit of a wireless power transmission device according to the present invention;

FIG. 11 is a diagram for explaining a laser light emitted through a cross-section of a light output unit of a wireless power transmission device according to the present invention;

FIGS. 12 to 14 are diagrams for explaining an internal structure of a light output unit of a wireless power transmission device according to the present invention;

BEST MODE

Figure 1:
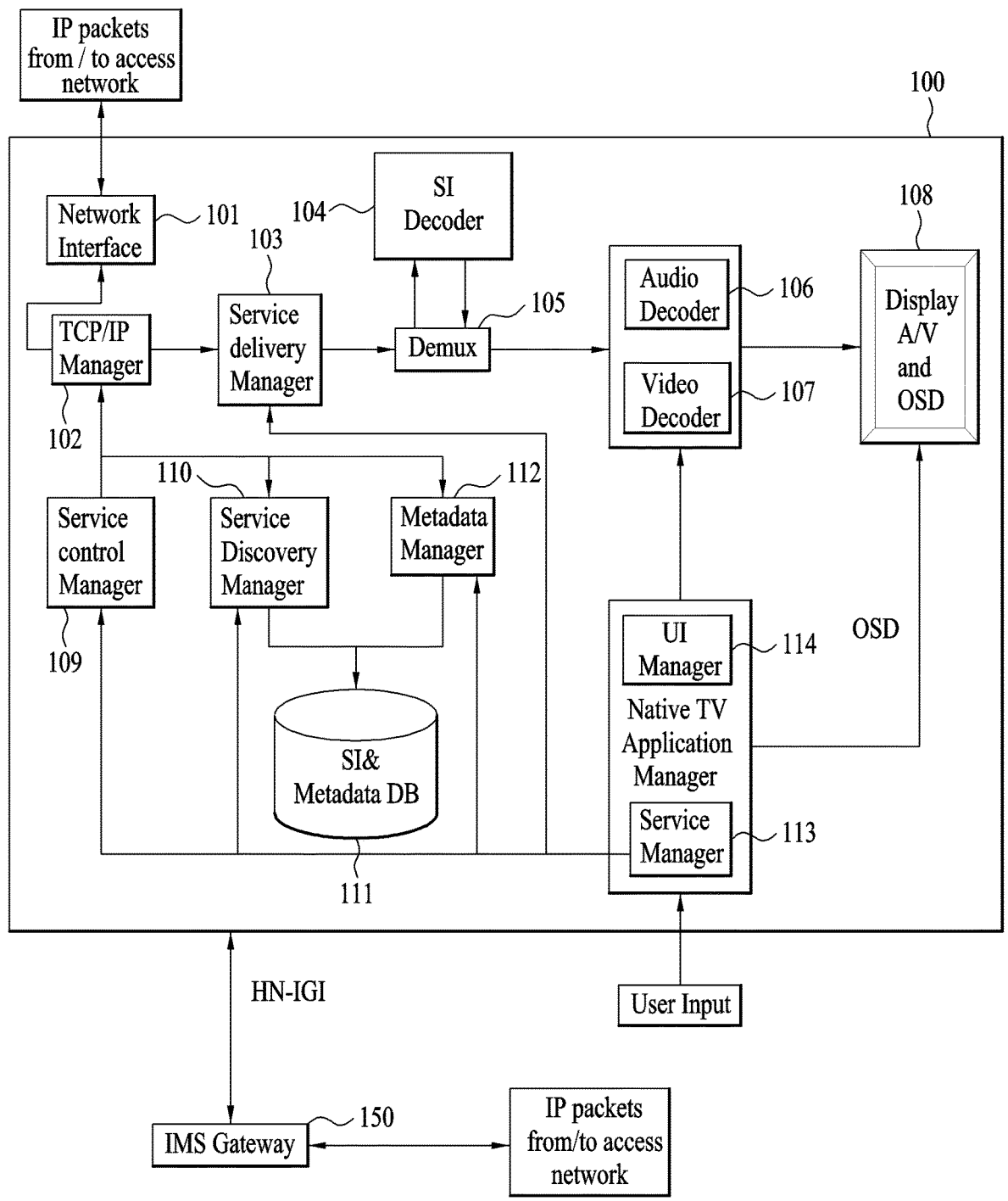
FIG. 1 is a diagram illustrating one embodiment of a wireless power reception device according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following, a wireless power transmission device according to the present invention and a method therefor are explained in detail with reference to the attached drawings.

In the aspect of a distance, a wireless power transmission technique is classified into a short distance wireless power transmission technique including a self-induction scheme and a magnetic resonance scheme and a long distance wireless power transmission technique including a microwave scheme and a laser scheme. In the aspect of a contact, the wireless power transmission technique is classified into a contact type wireless power transmission technique and a non-contact type wireless power transmission technique. However, in order to help easily understand and describe the present invention, the long distance wireless power transmission technique and/or the non-contact type wireless power transmission technique are mainly explained in the present specification. In this case, although a range covered by the long distance wireless power transmission technique is wholly or partly overlapped with a range covered by the non-contact type wireless power transmission technique, it may not mean that the techniques are the same technique. Meanwhile, the present invention is not restricted to the long distance wireless power transmission technique and/or the non-contact type wireless power transmission technique. The present invention can also be applied to the short distance wireless power transmission technique and/or the contact type wireless power transmission technique. However, for clarity, a wireless power transmission technique is explained in a manner of being referred to as "non-contact type wireless power transmission technique" in the present specification, by which the present invention may be non-limited.

Meanwhile, for clarity, the non-contact type wireless power transmission technique according to the present invention is explained with a laser scheme as one embodiment irrespective of a distance, by which the present invention may be non-limited. The laser scheme uses laser as a light source. However, a light source according to the present invention is not restricted to laser. All light sources including an LED (Light Emitting Diode) capable of generating light (photon) using electricity, an electric light, and the like can be replaced with the laser.

Meanwhile, when laser is used as a light source, since a UV (ultra-violet) ray region is considerably absorbed in the air and a visible ray region has a visual reason, a near infrared ray region or an infrared (IR) region is mainly used.

In other word, in the present specification, wireless power transmission using a laser light is described. In this case, in relation to the wireless power transmission, a method of separating the laser light, a method of using a part of the separated laser light for wireless power transmission, and a method of using the remaining laser light for detecting an object are explained in the present specification in consideration of such a safety problem as recently spotlighted harmfulness to human body, and the like. When an object is detected, a method of processing a laser light, various forms or structures of a wireless power transmission device for detecting the object, and the like are explained in the present specification.

As mentioned in the foregoing description, a wireless power transmission device is mainly explained in the present specification for clarity. Meanwhile, a wireless power reception device corresponding to the wireless power transmission device can include all electronic devices necessary to be charged for an operation of the devices such as a TV, a home appliance, a smartphone, a mobile terminal such as a wearable device, a lighting device, an electric vehicle, a razor, a solar generator, and the like. For clarity, the wireless power reception device is explained within a necessary range only in the present specification and detail explanation on the wireless power reception device is omitted.

In the following, as an example of the wireless power reception device, FIGS. 1 and 2 illustrate an embodiment of configuring a TV and an embodiment of configuring a mobile terminal, respectively. In the following, the TV and the mobile terminal are briefly explained. However, as mentioned in the foregoing description, the wireless power reception device is not restricted to the TV shown in FIG. 1 and the mobile terminal shown in FIG. 2.

The TV, for example, corresponds to a device that performs at least one selected from the group consisting of transmitting/receiving data, processing data, and outputting data. In this case, the data includes contents, services, and all data related to an application. The TV can transmit/receive the data in a manner of being connected with a different device, an external server, and the like through a wired/wireless network. If necessary, the data can be converted before being transmitted or received. For example, the TV can include a network TV, a HBBTV, a smart TV, an IPTV, and the like. For clarity, the TV described in the present specification may correspond to a configuration equipped with a display panel only or a set configuration such as an STB (Set-Top Box).

Referring to FIG. 1, as an embodiment of a wireless power reception device, a TV 100 can be configured by including a network interface 101, a TCP/IP manager 102, a service delivery manager 103, an SI decoder 104, a demux or demultiplexer 105, an audio decoder 106, a video decoder 107, a display unit 108, a service control manager 109, a service discovery manager 110, an SI & metadata DB 111, a metadata manager 112, a service manager 113, a UI manager 114, and the like.

The network interface 101 transmits and receives IP packet(s) (Internet Protocol (IP) packets(s)) or IP datagram(s) (hereinafter, IP packet(s)) via a network accessed by the network interface. The IP packet(s) includes data on services, applications, contents, and the like. Meanwhile, the network interface 101 may correspond to a tuner receiving a broadcast signal received on RF (Radio Frequency) or a configuration element including the tuner.

The TCP/IP manager 102 involves in packet delivery between IP packets received by the TV 100 and IP packets transmitted by the TV 100, i.e., between a source and a destination. The TCP/IP manager 102 classifies received packets to make the packets correspond to an appropriate protocol and outputs the classified packet(s) to the service delivery manager 105, the service discovery manager 110, the service control manager 109, the metadata manager 112, and the like.

The service delivery manager 103 is in charge of controlling a received service data. For example, when the service delivery manager controls real-time streaming data, the service delivery manager 103 can use RTP/RTCP. When the real-time streaming data is transmitted using the RTP, the service delivery manager 103 parses the received data packet according to the RTP and transmits the parsed data packet to the demultiplexer 105. Or, the service delivery manager 103 stores the parsed data packet in the SI & metadata DB 111 according to the control of the service manager 113. Subsequently, the service delivery manager 103 feedbacks the information received from the network to a server providing a service.

The demultiplexer 105 demultiplexes received packets into audio, video, SI (System or Service Information) data and transmits the demultiplexed SI data to the audio/video decoder 106/107, and the SI decoder 104.

The SI decoder 104 decodes the multiplexed SI data (e.g., service information such as PSI, PSIP, DVB-SI, DTMB/CMMB, etc.). The SI decoder 104 can store the decoded service information in the SI & metadata DB 111. For example, the stored service information can be used in a manner of being retrieved by a corresponding configuration in accordance with a request of a user.

The audio/video decoder 106/107 decodes demultiplexed audio data and video data, respectively. The decoded audio data and the video data are provided to a user through the display unit 108.

For example, the application manager includes the service manager 113 and the UI manager 114 and can perform a controller function of the TV 100. In other word, the application manager manages overall status of the TV 100, provides a UI (User Interface), and can manage a different manager.

The UI manager 114 provides a user with a GUI (Graphic User Interface)/UI using OSD (On Screen Display), receives a key input from the user, and performs a device operation according to the input. For example, when the UI manager 114 receives a key input for selecting a channel from the user, the UI manager 114 transmits the key input signal to the service manager 113.

The service manager 113 controls managers associated with a service such as the service delivery manager 103, the service discovery manager 110, the service control manager 109, the metadata manager 112, and the like.

The service manager 113 generates a channel map/service map and controls a channel/service to be selected using the generated channel map in accordance with a key input received from the UI manager 114. The service manager 113 receives service information from the SI decoder 104 and sets an audio/video PID (Packet Identifier) of a selected channel to the demultiplexer 105. The PID can be used for the aforementioned demultiplexing procedure. In particular, the demultiplexer 105 can perform filtering (PID or section filtering) on audio data, video data, and SI data using the PID.

The service discovery manager 110 provides information necessary for selecting a service provider that provides a service. When a signal for selecting a channel/service is received from the service manager 113, the service discovery manager 110 discovers a service using the information.

The service control manager 109 is in charge of selecting and controlling a service. For example, when a user selects a live broadcasting service such as a legacy broadcasting scheme, the service control manager 109 uses IGMP or RTSP to select and control a service. On the other hand, when the user selects a service such as VOD (Video On Demand), the service control manager 109 uses RTSP to select and control a service. The RTSP protocol can provide a trick mode to real-time streaming. The service control manager 109 can initialize and manage a session passing through an IMS gateway 150 using IMS SIP. The protocols are just an embodiment only. It may be able to use a different protocol depending on an implementation example.

The metadata manager 112 manages metadata associated with a service and stores the metadata in the SI & metadata DB 111.

The SI & metadata DB 111 stores service information decoded by the SI decoder 104, metadata managed by the metadata manager 112, and information necessary for selecting a service provider provided by the service discovery manager 110. The SI & metadata DB 111 can store configuration data for a system and the like. The SI & metadata DB 111 can be implemented using a Non-Volatile RAM (NVRAM) or a flash memory.

The IMS gateway 150 corresponds to a gateway including functions necessary for accessing an IMS-based IPTV service.

Besides, the power supply unit 160 supplies power to the aforementioned TV configuration elements. The power supply unit 160 includes a wire interface necessary for supplying power to the TV. In order to receive wireless power transmitted from a wireless power transmission device according to the present invention, the power supply unit 160 includes a wireless power reception interface (not depicted) as well. The wireless power reception interface is implemented in a front side or a rear side of the TV or can be implemented in a separate device at the outside of the TV. The wireless power reception interface can be implemented in a form of providing power to the TV through a wired/wireless connector.

Referring to FIG. 2, as a different embodiment of a wireless power reception device, a mobile terminal 200 is described.

A mobile terminal is evolving from a form of a smartphone performing a function of producing and consuming contents in addition to a communication function to a form of performing various functions by interworking with various things. As an example of the mobile terminal, a device capable of being worn on a user, i.e., wearable device, can also be included in the mobile terminal. Devices such as smart watch, a smart glass, a HMD (head mounted display), EMD, and VR and products capable of being worn on a user such as clothes, shoes, and the like can be included in the wearable device.

Figure 2A:
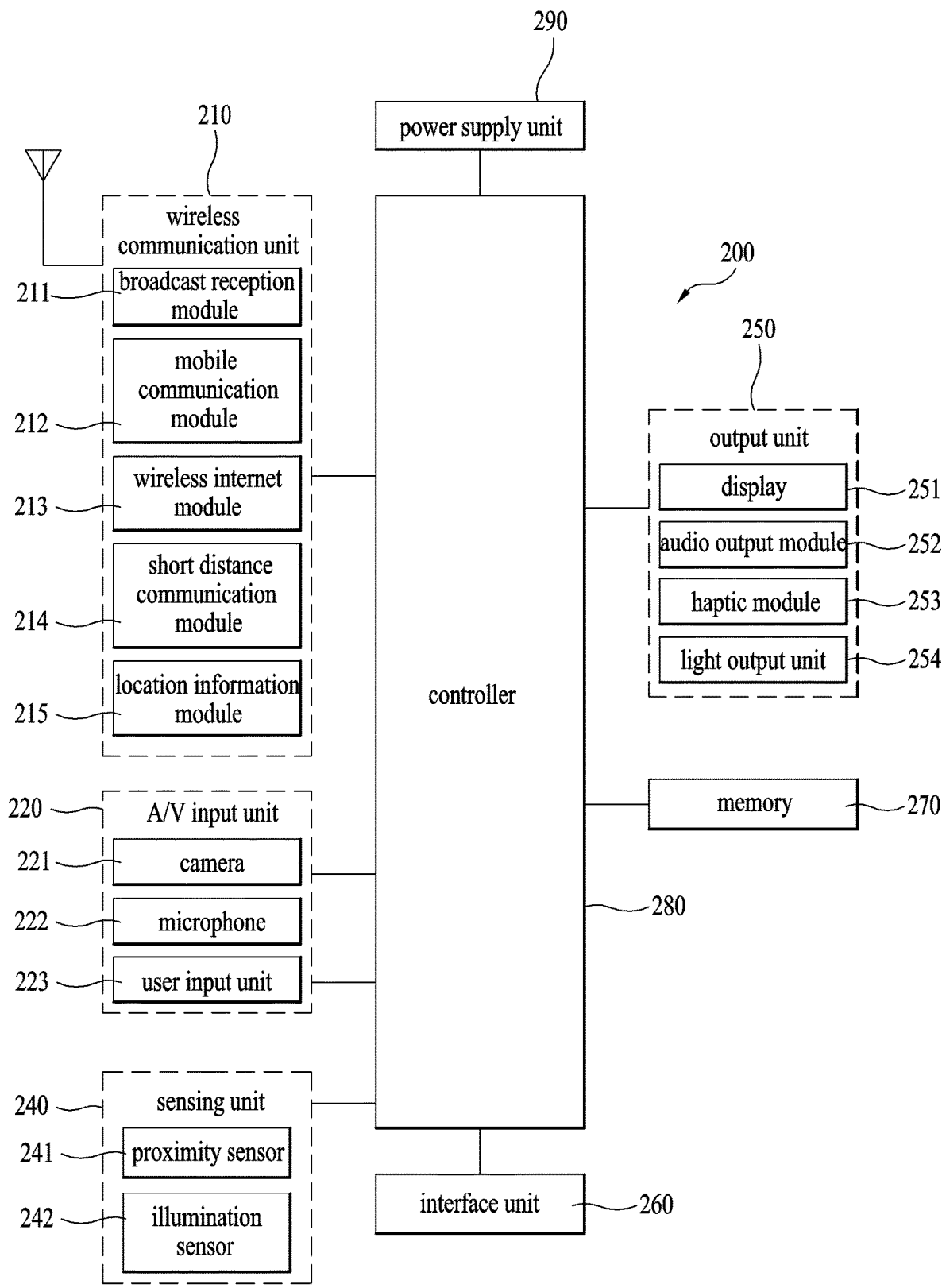
FIGS. 2a, 2b and 2c are diagrams illustrating a different embodiment of a wireless power reception device according to the present invention.
Figure 2B:
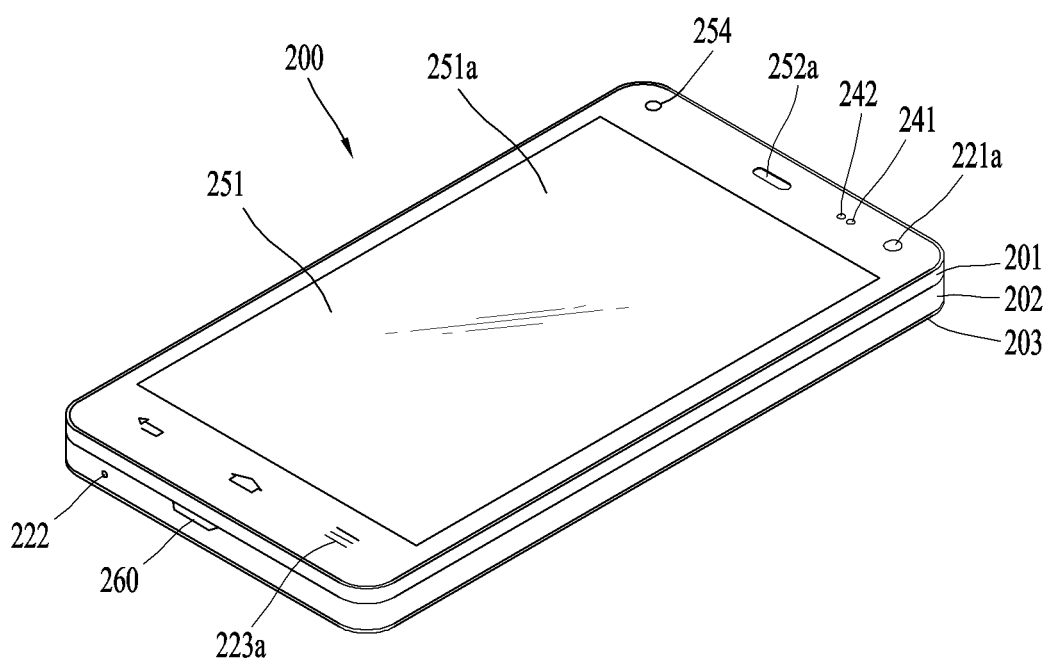
Figure 2C:
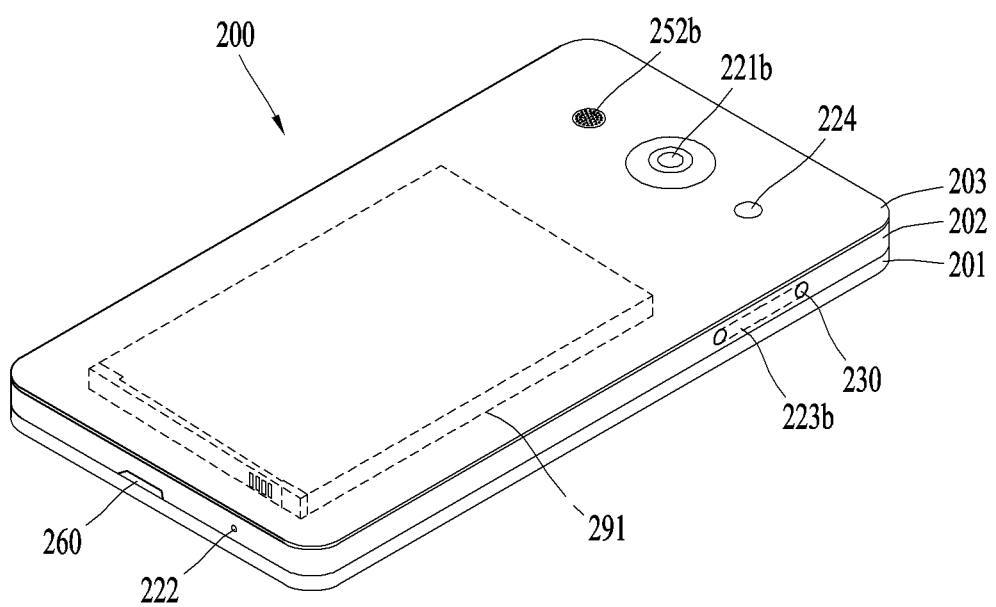

Referring to FIGS. 2a to 2c, FIG. 2a is a block diagram for explaining a mobile terminal according to the present invention and FIGS. 2b and 2c are conceptual diagrams for an example of a mobile terminal according to the present invention seen from a different view.

The mobile terminal 200 is shown having components such as a wireless communication unit 210, an input unit 220, a sensing unit 240, an output unit 250, an interface unit 260, a memory 270, a controller 280, and a power supply unit 290. It is understood that implementing all of the components shown in FIG. 2a is not a requirement, and that greater or fewer components may alternatively be implemented.

The wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks.

To facilitate such communications, the wireless communication unit 210 includes at least one selected from the group consisting of a broadcast receiving module 211, a mobile communication module 212, a wireless Internet module 213, a short-range communication module 214, and a location information module 215.

The input unit 120 includes a camera 221 or an image input unit for inputting an image signal, a microphone 222 or an audio input unit for inputting an audio signal, and a user input unit 223 (for example, a touch key, a push key, and the like) for allowing a user to input information. Audio data or image data obtained by the input unit 220 is analyzed and can be processed by a control command of a user.

The sensing unit 240 is typically implemented using one or more sensors configured to sense at least one selected from the group consisting of internal information of the mobile terminal, the surrounding environment information of the mobile terminal, and user information. For example, the sensing unit 240 can include at least one selected from the group consisting of a proximity sensor 241, an illumination sensor 242, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 122, a battery gauge, an environment sensor (for example, a barometer, a hygrometer, a thermometer, a radiation detection sensor, a thermal detection sensor, and a gas detection sensor), and a chemical sensor (for example, an electronic nose, a health care sensor, a biometric sensor, and the like). The mobile terminal 100 can be configured to utilize information obtained from two or more sensors by combining the information.

The output unit 250 is typically configured to output various types of information, such as audio, video, tactile output, and the like. The output unit 250 can include at least one selected from the group consisting of a display unit 251, an audio output module 252, a haptic module 253, and an optical output module 254. The display unit 251 may have an inter-layered structure or an integrated structure with a touch sensor to form a touch screen. The touch screen may provide an output interface between the mobile terminal 200 and a user, as well as function as the user input unit 223 which provides an input interface between the mobile terminal 200 and the user.

The interface unit 260 serves as an interface with various types of external devices that can be coupled with the mobile terminal 200. The interface unit 260 can include at least one selected from the group consisting of wired or wireless headset ports, external power supply ports, wired or wireless data ports, memory card ports, ports for connecting a device equipped with an identification module, audio input/output (I/O) ports, video I/O ports, and earphone ports. In some cases, the mobile terminal 200 may perform assorted control functions associated with a connected external device, in response to the external device being connected to the interface unit 260.

The memory 270 is typically implemented to store data to support various functions of the mobile terminal 200. For instance, the memory 270 can be configured to store application programs executed in the mobile terminal 200, data or instructions for operations of the mobile terminal 200, and the like. Some of these application programs may be downloaded from an external server via wireless communication. Other application programs may be installed in the mobile terminal 200 at time of manufacturing the mobile terminal 200 for a basic function (for example, receiving a call, placing a call, receiving a message, sending a message, and the like). It is common for application programs to be stored in the memory 270, installed in the mobile terminal 200, and executed by the controller 280 to perform an operation (or function) of the mobile terminal 200.

The controller 280 controls overall operation of the mobile terminal 200, in addition to the operations associated with the application programs. The controller 280 processes a signal, data, information and the like inputted or outputted via the aforementioned configuration elements or executes an application program stored in the memory 270 to provide or process information or functions appropriate for a user.

In order to execute the applications programs stored in the memory 270, the controller 280 can control at least a part of the configurations elements mentioned earlier in FIG. 2a. Moreover, in order to execute the application programs, the controller 280 can operate at least two or more configuration elements included in the mobile terminal 200 by combining the configuration elements.

The power supply unit 290 receives external power or internal power under the control of the controller 280 to supply power to each of the configuration elements included in the mobile terminal 200. The power supply unit 290 may include a battery, and the battery may be configured to be embedded in the terminal body, or configured to be detachable from the terminal body. Meanwhile, similar to the aforementioned power supply unit 160 of the TV, the power supply unit 290 of the mobile terminal also includes a wireless power reception interface (not depicted) necessary for receiving wireless power transmitted from the wireless power transmission device according to the present invention. The wireless power reception interface is implemented in a front side or a rear side of the mobile terminal or can be implemented in a separate device (e.g., charger) at the outside of the mobile terminal. The wireless power reception interface can be implemented in a form of providing power to the mobile terminal through a wired/wireless connector.

In the following, a wireless power transmission device and a method therefor are explained in more detail with reference to the attached drawings.

The present invention intends to increase use safety by detecting an object (e.g., user) using a guide beam of a laser light corresponding to a medium of power transmission by separating a laser light to perform laser wireless charging. For example, the infrared laser light uses a region of a wavelength not detected by an eye of a human and the infrared region corresponds to a wavelength used as a sensor for recognizing a human. A light of a FWHM (Full Width at Half-Maximum) region of a laser light occupies the majority of energy and a light of a low density region other than the FWHM region has little energy. Hence, the light of the low density region is used as a light emitting unit of a sensor configured to recognize an object.

Meanwhile, according to the present invention, an IR sensor can detect a user and control an amount of charging without a separate IR emitter, thereby increasing safety. And, it is able to prevent energy charging efficiency from being degraded due to such an object as a foreign substance, an obstacle, and the like.

Figure 3:
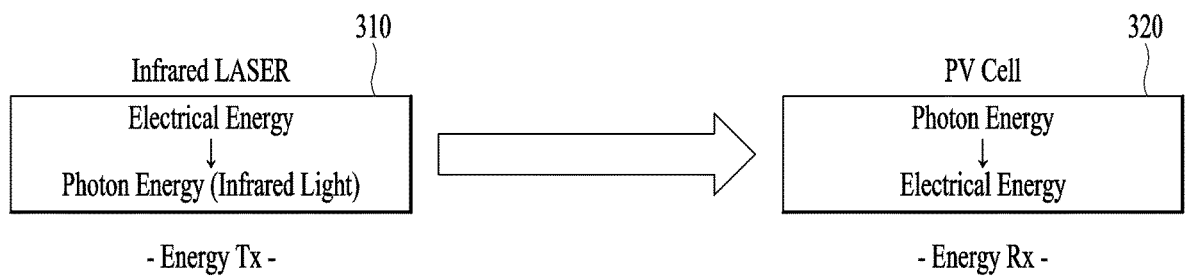
FIG. 3 is a diagram for explaining a laser wireless charging method according to the present invention.
Figure 4:
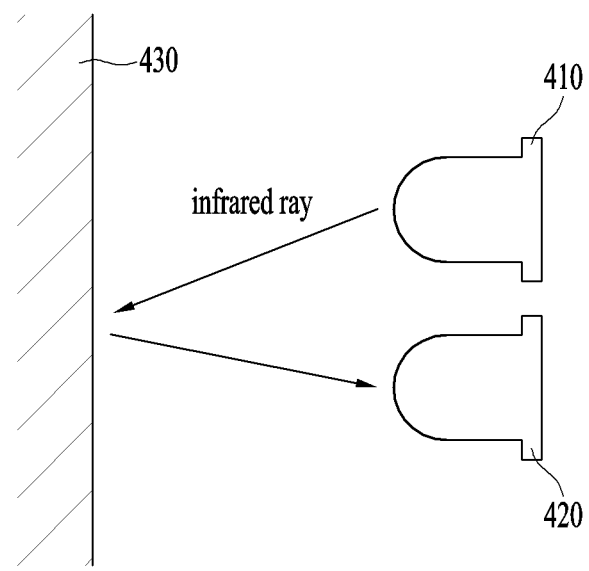
FIG. 4 is a diagram for explaining an IR detect sensor according to the present invention.
Figure 5:
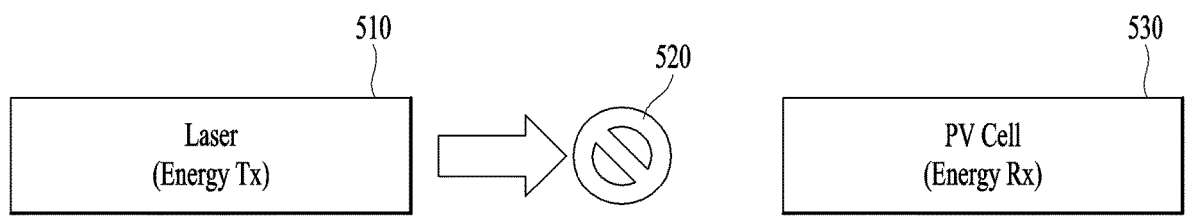
FIG. 5 is a diagram for explaining wireless charging when an object is detected in a laser wireless charging process illustrated in FIG. 3.

FIG. 3 is a diagram for explaining a laser wireless charging method according to the present invention, FIG. 4 is a diagram for explaining an IR detect sensor according to the present invention, and FIG. 5 is a diagram for explaining wireless charging when an object is detected in a laser wireless charging process illustrated in FIG. 3.

Referring to FIG. 3, wireless charging using laser is a wireless charging scheme of a medium long range type that mainly uses an infrared laser as an energy source (Tx) 310 and uses a PV cell (Photovoltaic Cell, an element using the photoelectric effect, a solar battery) as an energy reception unit (RX) 320.

Since the wireless charging using laser illustrated in FIG. 3 uses an infrared region, a light is not detected by a naked eye. However, infrared energy (a part of an electromagnetic wave) is actually flowing. This type of wireless charging may transmit energy as high as several W, scores of W, or higher depending on a target product.

Referring to FIG. 4, a currently used general infrared sensor is illustrated. The infrared sensor consists of a light emitting unit 410 and a light collecting unit 420. An infrared light emitted from the light emitting unit 410 is reflected on a specific object 430 and is detected in the light collecting unit 420. In general, the infrared sensor measures a detection/distance of an object. A light emitting sensor (IR Emitter) used for the infrared sensor mainly uses a light of low power.

Referring to FIG. 5, when the energy source (Tx) 310/510 using laser emits a laser light to the energy reception unit (Rx) 320/520, if there is an object 520, the laser light for wireless charging is not transferred to the energy reception unit (Rx) 320/520 due to the object 520.

When wireless charging is performed using laser, a medium of energy transfer is a light of an infrared ray.

Although the light of the infrared ray is not detected by a naked eye, the light of the infrared ray is an electromagnetic (EM) wave identical to a light.

The medium of energy transfer transfers energy from the energy Tx to the energy Rx. If an obstacle or a foreign substance exists between the energy Tx and the energy Rx, since energy transfer is not properly performed, a charging scheme may have a problem. Moreover, if a human body is directly exposed to an infrared laser, it may have some risk. Hence, the present invention intends to solve the problem above and a safety issue.

Although a part of infrared laser is used for skin care by controlling the output of the infrared laser, the infrared laser uses a very low level of energy. Since the technique described in the present specification aims to transfer energy, much higher energy is used. Hence, if a human body is directly exposed to the laser, risk may exist.

In general, an electromagnetic wave of an infrared wavelength penetrates most objects. However, while the electromagnetic wave penetrates an object, energy is reduced. In particular, the electromagnetic wave is unable to penetrate metals and the most of the electromagnetic wave is reflected as it is.

Figure 6A:
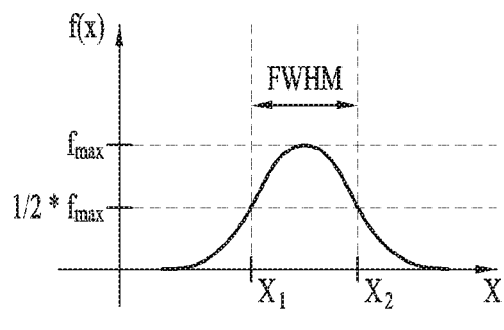
FIG. 6(a) is a graph for explaining energy distribution of a laser light and a FWHM region according to the present invention and FIG. 6(b) is a diagram for explaining a laser light and energy distribution.
Figure 6B:
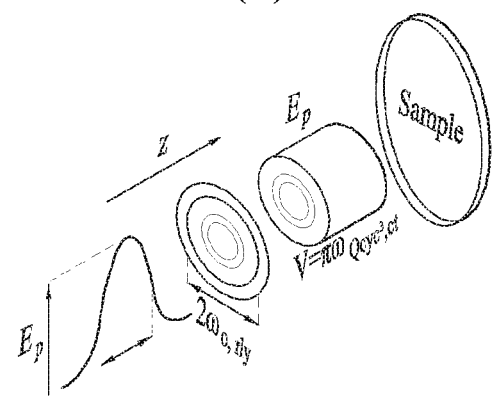

FIG. 6(a) is a graph for explaining energy distribution of a laser light and a FWHM region according to the present invention and FIG. 6(b) is a diagram for explaining a laser light and energy distribution.

In order to solve the aforementioned problem and a use safety issue, the present invention proposes a method of separating an infrared laser light corresponding to the energy Tx into 2 lights using an additional optical fiber.

One is a main IR light for energy transfer, i.e., a light of high density energy for laser wireless charging, and another one is an IR light for detecting an object, i.e., a light of low density energy as a light emitting element used for an infrared detection sensor.

A basic laser light has a Gaussian energy distribution form illustrated in a graph of FIG. 6a. M2 is an indicator indicating a level of closeness of an energy distribution of a laser light with the Gaussian energy distribution. As the M2 is getting close to 1, it may have a shape of the Gaussian distribution. For clarity, FIG. 6a is explained under the assumption that the Gaussian distribution M2 corresponds to 1.

The center of the laser has the highest energy and the energy tends to be reduced as getting away from the center. In this case, a region where the maximum energy is reduced by half is referred to as a FWHM region.

FIG. 7 is a diagram for explaining a structure and a principle of an optical fiber according to the present invention.

The present invention uses a structure of a legacy optical fiber by transforming the structure. For example, a general optical fiber consists of a core and cladding.

Assume that a refractive index of the core corresponds to n and a refractive index of the cladding corresponds to n'. In this case, when the n is less than the n', total reflection occurs and a light is trapped into the core. The optical fiber uses the phenomenon above. In other word, the optical fiber uses a phenomenon that a light launched into the core is unable to penetrate the cladding having a refractive index higher than a refractive index of the core and the light is delivered along the core.

The present invention uses a scheme different from a legacy optical fiber.

Figure 8:
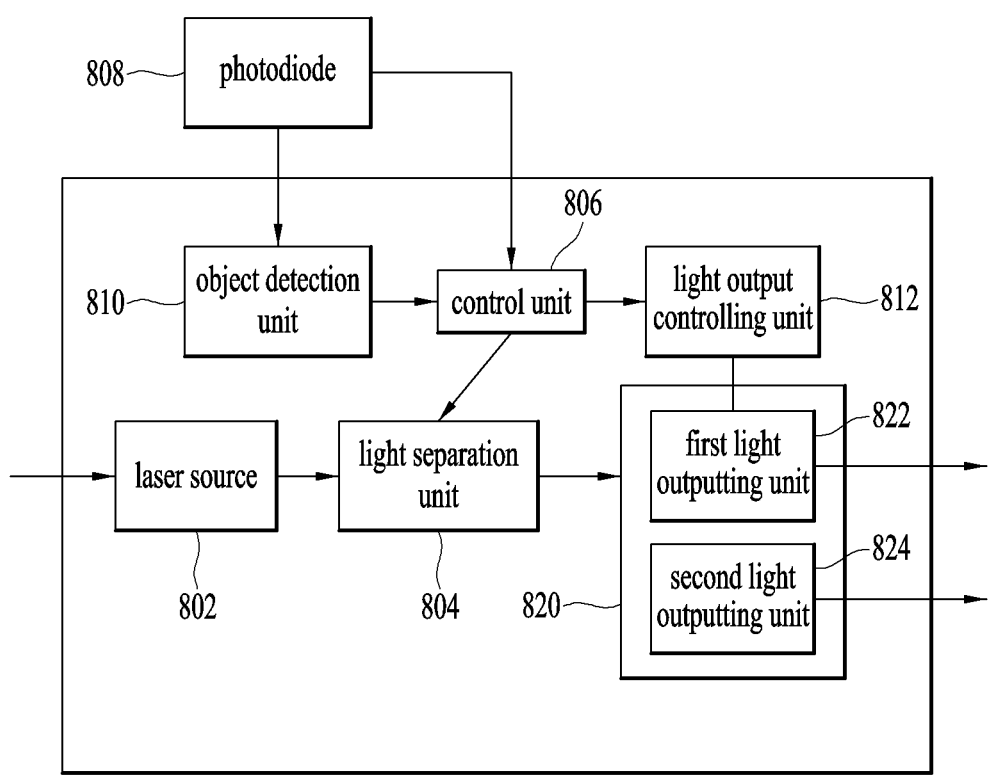
FIG. 8 is a block diagram for a configuration of a laser wireless charging system according to one embodiment of the present invention.

FIG. 8 is a block diagram for a configuration of a laser wireless charging system according to one embodiment of the present invention.

The wireless power transmission device according to one embodiment of the present invention includes a laser light source, a light outputting unit configured to output a laser light generated by the laser light source unit by dividing the laser light into a first laser light for performing wireless charging and a second laser light for detecting an object, a light receiving unit configured to receive the second laser light, and a light controlling unit configured to control the output of the first laser light through the second laser light received by the light receiving unit. The light controlling unit can determine whether or not an object is detected based on the second laser light received by the light receiving unit.

Referring to FIG. 8, according to one embodiment, a wireless power transmission unit can include a laser light source 802, a light controlling unit 806, a light receiving unit, and a light outputting unit 820. At least one of a light separation unit 804 and a light output controlling unit 812 illustrated in FIG. 8 can be replaced with the light controlling unit 806 or can be implemented by an internal module of the light controlling unit 806. In other word, the light controlling unit 806 can perform at least one of functions of the light separation unit 804 and the light output controlling unit 812 instead of the light separation unit 804 and the light output controlling unit 812.

The laser light source 802 generates an infrared laser light according to the present invention. The generated laser light is delivered to a light receiving unit of a wireless power reception device via the light outputting unit 820. In this case, the laser light can be controlled by the light controlling unit 806.

The light receiving unit corresponds to a configuration element configured to receive a laser light emitted to the external via the light outputting unit 820. The light receiving unit receives the emitted laser light via a photodiode 808.

The light controlling unit 806 determines whether or not an object is detected via the laser light received by the photodiode 808 of the light receiving unit. The determination on whether or not the object is detected can also be performed by an object detection unit 810 illustrated in FIG. 8. In other word, the object detection unit 810 of FIG. 8 may correspond to a separate configuration and the light controlling unit 806 can perform a function of the object detection unit instead of the object detection unit 810.

The light controlling unit 806 controls the output of a laser light emitted to the external via the first light outputting unit 822 and the second light outputting unit 824 of the light outputting unit 820 based on whether or not an object is detected. Regarding this, it shall be explained later in more detail.

Figure 9:
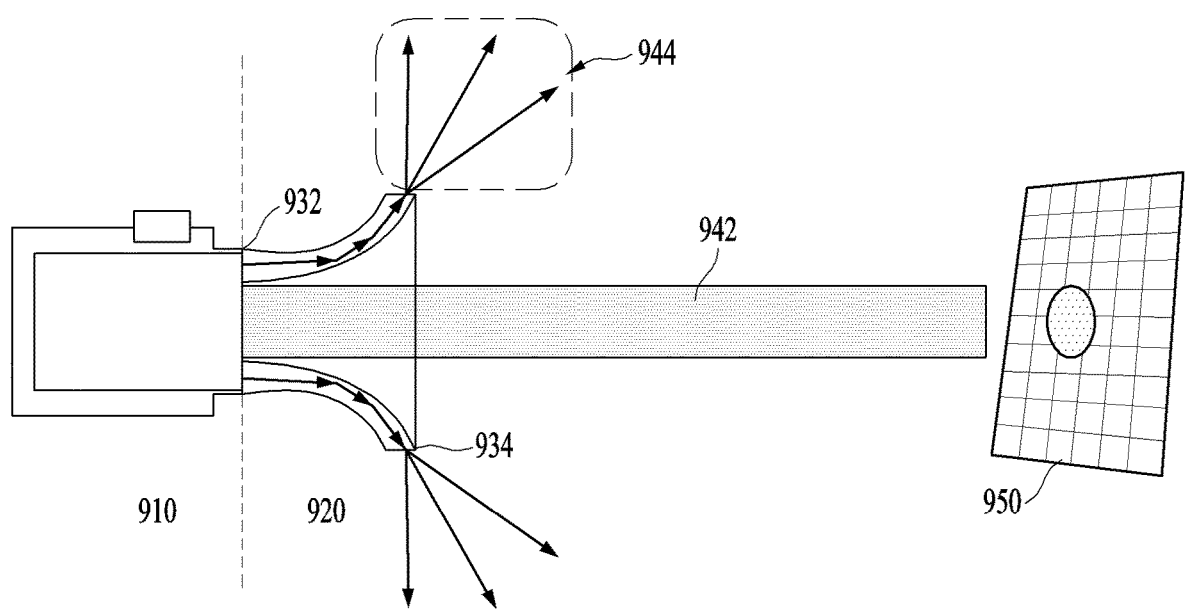
FIG. 9 is a diagram for a wireless power transmission device and a wireless power reception device according to the present invention.

FIG. 9 is a diagram for a wireless power transmission device and a wireless power reception device according to the present invention and FIG. 10 is a diagram illustrating an emitting path of a laser light emitted through a light output unit of a wireless power transmission device according to the present invention.

The wireless power transmission device illustrated in FIG. 9 corresponds to a model implemented by including the configuration elements of the wireless power transmission device illustrated in FIG. 8. Meanwhile, the wireless power transmission device illustrated in FIG. 9 is illustrated by a cross-sectional diagram to more easily explain the flow of a laser light.

And, for clarity, a wireless power reception device illustrated in FIG. 9 is illustrated with an example of a PV cell.

In the following, the wireless power transmission device of FIG. 9 is explained in more detail with reference to the configuration elements of the wireless power transmission device illustrated in FIG. 8.

Referring to FIG. 9, the wireless power transmission device can be classified into a light processing unit 910 and a light outputting unit 920. In this case, the light processing unit 910 corresponds to a configuration including the laser light source 802, the light controlling unit 806, and the light receiving unit among the configuration elements of FIG. 8. The light outputting unit 920 corresponds to a configuration including the light outputting unit 820 of FIG. 8.

As mentioned in the foregoing description, the light outputting unit 920 outputs a laser light generated by the laser light source 802 by separating the laser light into a first laser light for performing wireless charging and a second laser light for detecting an object.

Referring to FIG. 9, to this end, the light outputting unit 920 includes a first light outputting unit for outputting the first laser light 942 and a second light outputting unit for outputting the second laser light 944. In this case, the first light outputting unit and the second light outputting unit can be configured by an optical fiber or by including the optical fiber.

Meanwhile, referring to FIG. 9, the light outputting unit can be classified into an input end 932 configured to deliver a laser light generated by the light processing unit 910 to the light outputting unit 920 and an output end 934 configured to emit the laser light to the external via the input end 932. In other word, the light outputting unit is classified into the input end 932 configured to receive a laser light generated by the laser light source and the output end 934 configured to emit the laser light received via the input end 932 to the external.

A length of the light outputting unit 920, i.e., a length between the input end 932 and the output end 934, can be determined based on a length predetermined at the time of manufacturing the wireless power transmission device. Or, the length can be randomly changed according to various elements such as a distance from a wireless power reception device at the time of installing the wireless power transmission device, environment of a location at which the wireless power transmission device is located, user configuration, and the like. Meanwhile, the length can be fixed or can be randomly changed.

Referring to FIG. 9, a size of a cross-section area of an input end may differ from a size of a cross-section area of an output end in the cross section of the light outputting unit. Or, the size of the cross-section area of the output end may be greater than the size of the cross-section area of the input end, vice versa. Meanwhile, a difference between the size of the cross-section area of the input end and the size of the cross-section area of the output end may have influence on the determination of a shape of the light outputting unit. For example, the output end of the light outputting unit may have a prescribed shape to make an angle of the first laser light 942 for performing wireless charging emitted via the first light outputting unit to be different from an angle of the second laser light 944 for detecting an object emitted via the second light outputting unit.

For example, the prescribed shape may have a curve shape to make the emitting angles to be different from each other.

For example, an angle of a second laser light 944 emitted to the external can be configured to have an angle less than 90 degrees on the basis of an angle of a first laser light 942 emitted via the first light outputting unit.

When a wireless power transmission device has a cross-sectional structure illustrated in FIG. 9 according to one embodiment of the present invention, the first laser light 942 for a FWHM region is transmitted to a wireless power reception device 950 such as a PV cell via the first light outputting unit to perform wireless charging and a laser light is emitted with an angle different from an angle of the first laser light 942 via the second light outputting unit to detect an object between the wireless power transmission device and the wireless power reception device, in particular, an object near an emitting path of the first laser light 942. This can be easily understood with reference to emitting angles and emitting paths of the first laser light 942 emitted via the first light outputting unit and the second laser light 944 emitted via the second light outputting unit.

FIG. 11 is a diagram for explaining a laser light emitted through a cross-section of a light output unit of a wireless power transmission device according to the present invention.

FIG. 11a illustrates laser lights for the whole of light outputting units, FIG. 11b illustrates the first laser light emitted via the first light outputting unit, and FIG. 11c illustrates the second laser light emitted via the second light outputting unit. The sum of the first laser light emitted via the first light outputting unit and the second laser light emitted via the second light outputting unit is identical to the laser lights illustrated in FIG. 11a.

Figure 12:
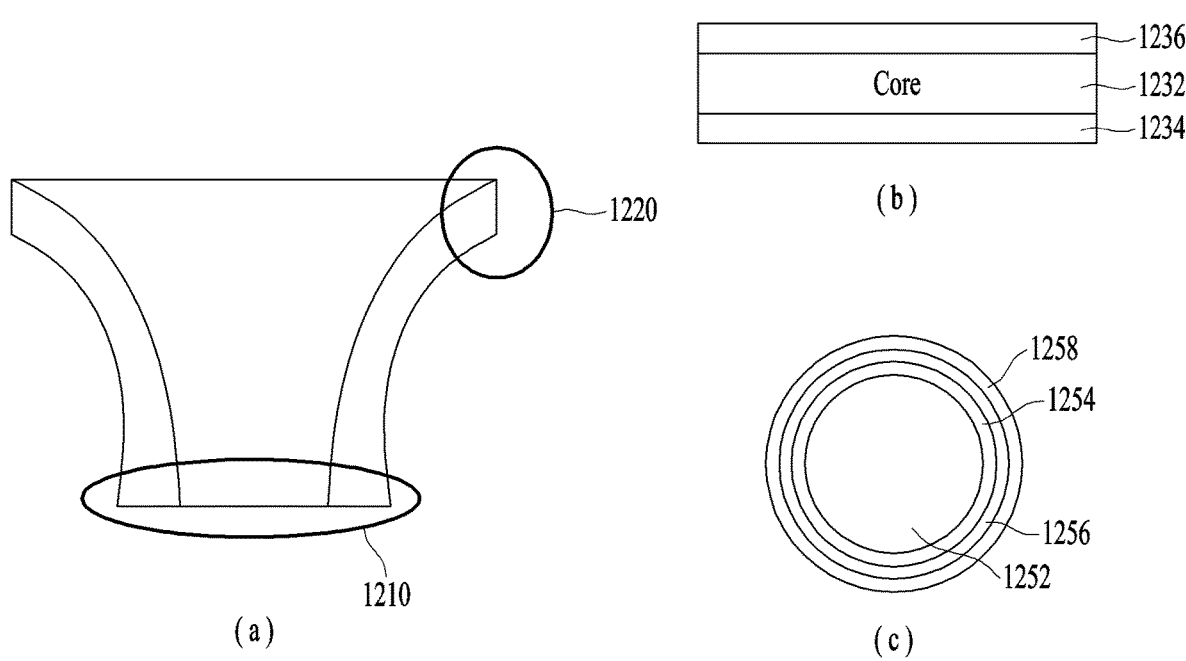

FIGS. 12 to 14 are diagrams for explaining an internal structure of a light output unit of a wireless power transmission device according to the present invention.

In the following, for clarity, an internal structure and an external structure of a light outputting unit are described only in FIGS. 12 to 14.

According to the present invention, a light outputting unit is configured by an optical fiber. In this case, the light outputting unit can be configured by either a single optical fiber or multiple optical fibers.

FIG. 12 illustrates a case that the light outputting unit is configured by the single optical fiber.

FIG. 12a is a longitudinal section diagram for a light outputting unit of a wireless power transmission device according to the present invention. The bottom part corresponds to an input end 1210 of the light outputting unit connected with a light processing unit and the upper part corresponds to an output end 1220 of the light outputting unit that emits a laser light to the external.

Referring to the longitudinal section diagram of the light outputting unit of the wireless power transmission device, an internal part corresponds to the first light outputting unit that emits the first laser light for performing wireless charging and an external part corresponds to the second light outputting unit that emits the second laser light for detecting an object.

As mentioned in the foregoing description, referring to the longitudinal section diagram of FIG. 12a, it is able to see that diameters (d1 and d2) are different from each other when cross-section areas of the input end 1210 and the output end 1220 or the light outputting unit has a circular form. As mentioned in the foregoing description, the cross-section area or the diameter d2 of the output end 1220 may be greater than the cross-section area or the diameter d1 of the input end 1210.

FIG. 12b is a cross-sectional diagram for an output end of a light outputting unit, in particular, the second light outputting unit. A core 1232 emitting the first laser light is wrapped up by claddings 1234, 1236 to make the first laser light to be fully reflected without being deviated from the core 1232.

FIG. 12c is a cross-sectional diagram for an input end of a light outputting unit and illustrates a case that the light outputting unit has a circular form. The circular form has a structure including the first core 1252 emitting the first laser light, the first cladding 1254 wrapping up the first core 1252 to make the first laser light emitted in the first core to be fully reflected, the second core 1256 emitting the second laser light, and the second cladding 1258 wrapping up the second core 1256 to make the second laser light emitted in the second core 1256 to be fully reflected.

FIGS. 12b and 12c can be more easily understood with reference to FIGS. 7a and 7b.

In particular, assume that a refractive index of the first core 1252 and a refractive index of the second core 1256 correspond to n1 and n3, respectively.

In this case, a refractive index (n2) of the first cladding 1254 is greater than the n1 and the n3. By doing so, the first laser light and the second laser light can be emitted while being fully reflected via the first core 1252 and the second core 1256, respectively. Meanwhile, it is necessary for a refractive index (n4) of the second cladding 1258 to be greater than the refractive index (n2) of the second core 1256. In the description above, the refractive index (n2) of the first cladding 1254 and the refractive index (n4) of the second cladding 1258 can be the same or different. However, as mentioned in the foregoing description, in order to make a laser light to be fully reflected in a corresponding core, a refractive index of a cladding should be greater than a refractive index of the core.

FIGS. 13 and 14 illustrate a case that a light outputting unit is configured by multiple optical fibers. In particular, FIG. 14 illustrates a case that the light outputting unit is configured by a combination of a single optical fiber and multiple optical fibers.

First of all, FIG. 13a is a cross-sectional diagram for an output end of a light outputting unit. Unlike FIG. 12, it is able to see that multiple optical fibers are included in a cross section of the output end. In this case, the outskirts 1312 of a cross-sectional structure in which the multiple optical fibers are included may correspond to a cladding or not. The outskirts configuration element may play a role of fixing the multiple optical fibers included in the output end.

Referring to the cross section of the output end illustrated in FIG. 13a, the cross section is tightly filled with multiple optical fibers. However, this is just one embodiment only. In particular, the output end can be implemented by the less number of optical fibers (e.g., at least two or more optical fibers).

FIG. 13b is a cross-sectional diagram for an input end of the light outputting unit. The input end of the light outputting unit consists of the first core 1322, the first cladding 1324, the second core 1326, and the second cladding 1328. In this case, unlike FIG. 12c, FIG. 13b illustrates a case that the second core 1326 is implemented by multiple optical fibers instead of a single optical fiber.

An internal structure of the multiple optical fibers illustrated in FIGS. 13a and 13b is shown in FIG. 13c. In particular, the internal structure is implemented by a core 1332 and a cladding 1334. Hence, it is not mandatory for the outskirts (e.g., cladding), the first cladding 1324, and the second cladding 1328 illustrated in FIGS. 13a and 13b to have the refractive index mentioned earlier in FIG. 12. However, in case of the first cladding 1324 shown in FIG. 13b, if the first core 1322 has a single optical fiber structure, it is necessary to consider a refractive index of the first core 1322 to make the first laser light emitted through the first core 1322 to be fully reflected.

FIGS. 14a, 14b, and 14c are cross-sectional diagrams for an output end of an outputting unit according to the present invention. FIGS. 14a, 14b, and 14c illustrate cross-sectional structures different from the cross-sectional structures shown in FIGS. 12 and 13.

Meanwhile, FIGS. 14d, 14e, and 14f are cross-sectional diagrams for an input end of an outputting unit according to the present invention. FIGS. 14d, 14e, and 14f illustrate cross-sectional structures different from the cross-sectional structures shown in FIGS. 12 and 13.

Although it is not depicted, if necessary, the first core emitting the first laser light for performing wireless charging can also be implemented by multiple optical fibers instead of a single optical fiber.

According to the present invention, at least one of the first light outputting unit and the second light outputting unit of the light outputting unit can be implemented by a member of flexible material. In particular, the second light outputting unit can be implemented using a flexible material. Or, at least one of the input end and the output end of the light outputting unit can be implemented using a member for changing an emitting direction or an emitting angle of the first laser light/second laser light emitted through the output end. Or, it may further include a separate member for the at least one of the input end and the output end of the light outputting unit.

Figure 15:
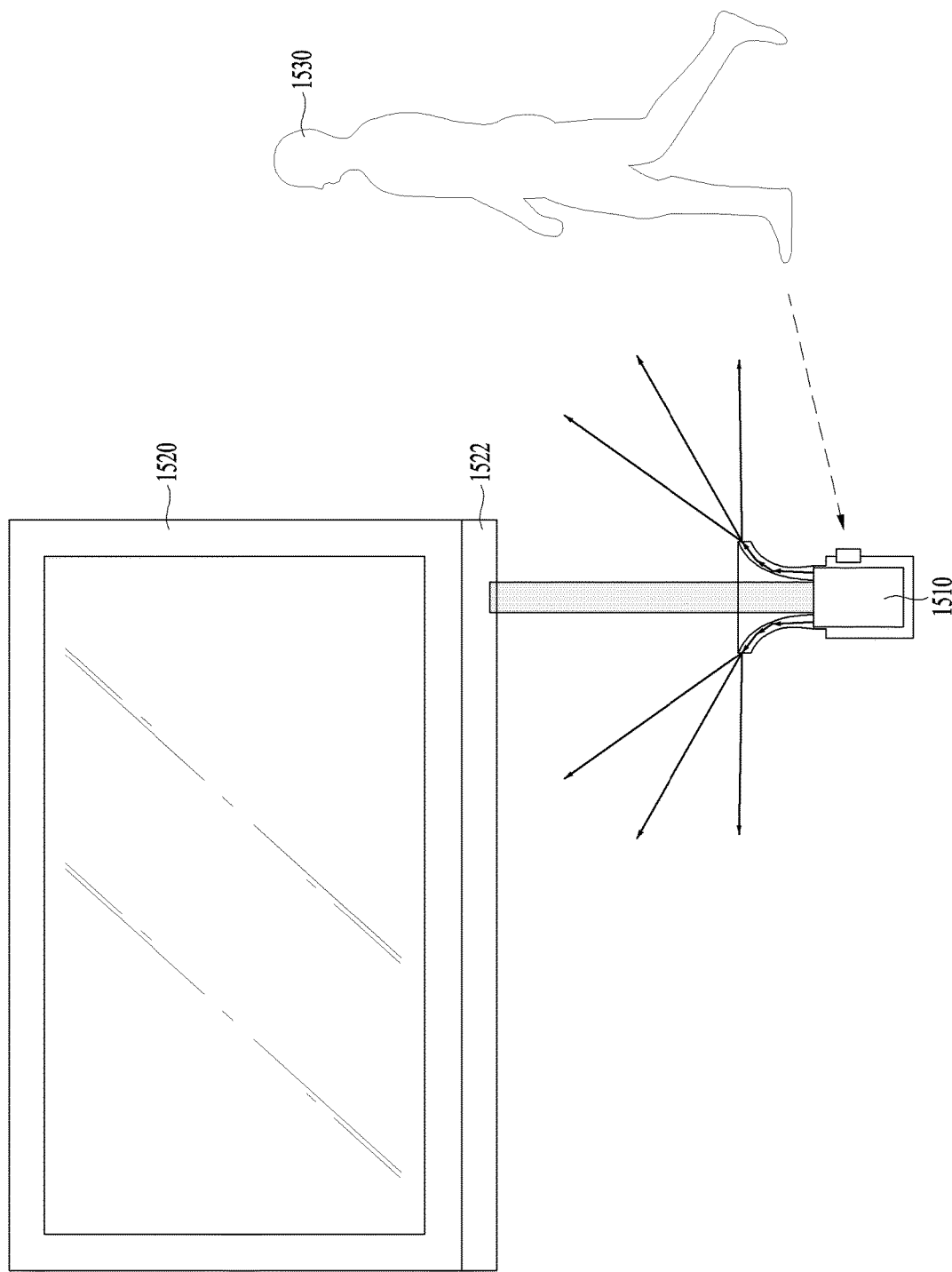
FIGS. 15 and 16 are diagrams for explaining a wireless charging scenario using a wireless power transmission device according to the present invention.
Figure 16:
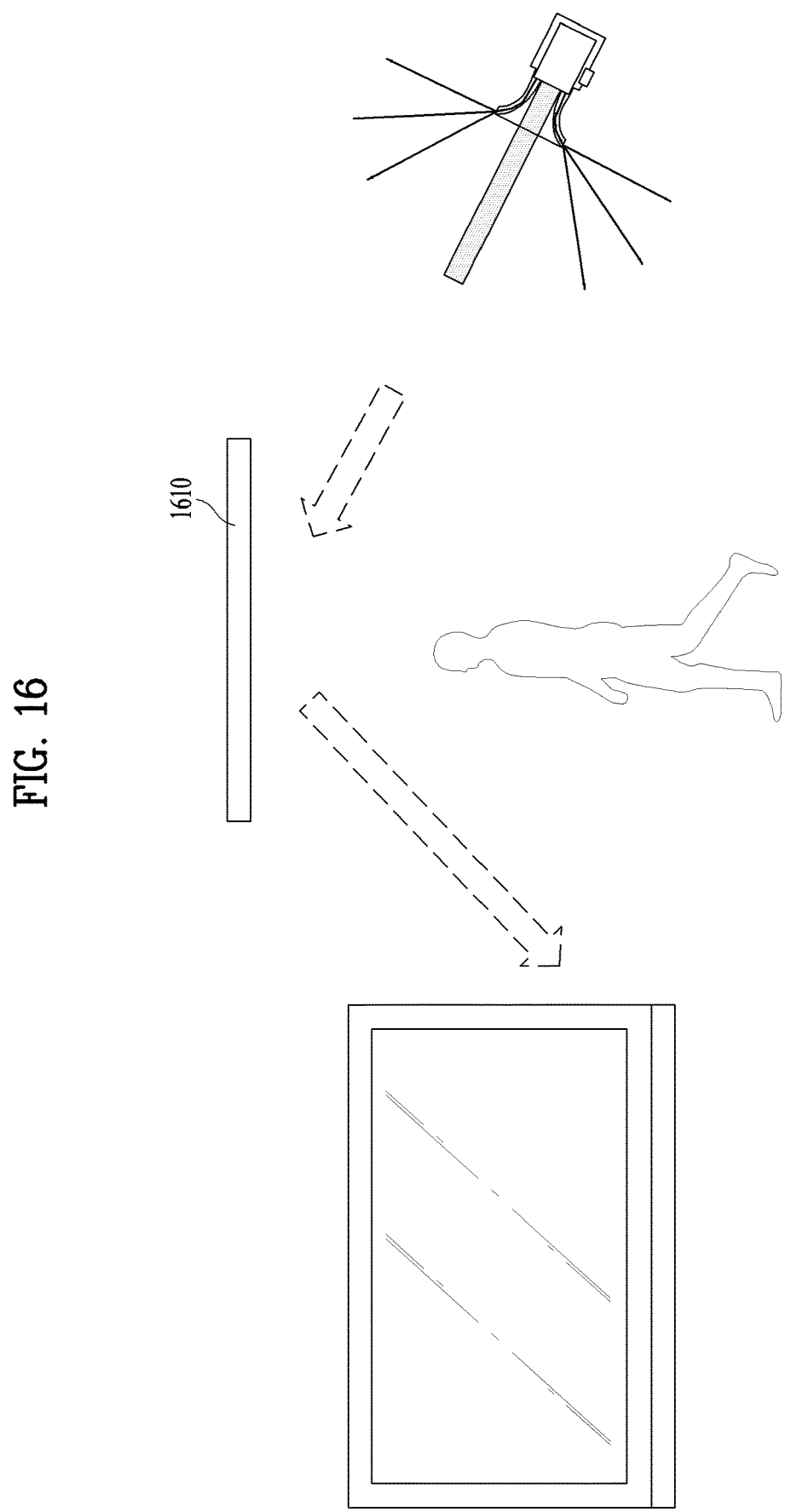

FIGS. 15 and 16 are diagrams for explaining a wireless charging scenario using a wireless power transmission device according to the present invention.

In the following, when a wireless charging service is performed using a wireless power transmission device, a method of detecting an object using a laser light for detecting an object and a method of controlling an output of the laser light according to the detected object are explained in detail.

Referring to FIG. 15, a wireless power transmission device 1510 emits a laser light to a wireless power reception device 1520 to perform wireless charging. In this case, for example, the wireless power reception device 1520 may correspond to a TV. A wireless power reception unit 1522 can be implemented on the front side of the TV. In this case, it is not mandatory that the wireless power reception unit 1522 is implemented on the wireless power reception device 1520. The wireless power reception unit 1522 can be implemented on a separate configuration and wireless charging can be performed by establishing a connection between the wireless power transmission device and the separate configuration. And, it is not mandatory that the wireless power reception unit 1522 is implemented on the front side of the wireless power reception device 1520. The wireless power reception unit 1522 can also be implemented on the rear side or a side of the wireless power reception device 1520.

Referring to FIG. 15, the wireless power transmission device 1510 emits the first laser light for performing wireless charging to the wireless power reception unit 1522 of the wireless power reception device to perform the wireless charging and the second laser light for detecting an object is emitted to a certain space between the two devices.

In this case, for example, when the wireless power reception unit 1522 receives the second laser light, the wireless power reception unit 1522 absorbs the second laser light to perform wireless charging. Or, although the wireless power reception unit 1522 absorbs the second laser light, the wireless power reception unit 1522 may ignore the second laser light in consideration of efficiency.

In FIG. 15, assume a scene that an object (e.g., a person) 1530 is approaching to the wireless power transmission device 1510 and the wireless power reception device 1520. In this case, a light controlling unit of the wireless power transmission device 1510 detects the object 1530 via the emitted second laser light and can control the output of the first laser light in consideration of the detected object 1530.

For example, when the object is detected based on the second laser light, the light controlling unit of the wireless power transmission device may not emit the first laser light by turning off the output of the first laser light until the object is not detected anymore. Or, the light controlling unit of the wireless power transmission device may control the output power of the first laser light to make an impact on an object (e.g., human body, etc.) to be minimized by lowering the output power of the first laser light of FWHM region to output power of a region other than the FWHM region.

Or, as shown in FIG. 16, it may use a separate configuration 1610 capable of changing an emitting angle of a laser light between a wireless power transmission device and a wireless power reception device. When the configuration 1610 capable of changing the emitting angle of the inputted laser light is referred to as a reflection board, the reflection board reflects the inputted laser light and forwards the reflected laser light to the wireless power reception device. The reflection board 1610 makes the efficiency of the laser light not to be reduced in consideration of a reflection coefficient of a surface to which the laser light is inputted. If necessary, it may be able to form a structure capable of randomly changing an angle of incidence and an angle of reflection.

Meanwhile, referring to FIG. 12, such a light receiving unit as a photodiode mounted on the wireless power transmission device is implemented on a light processing unit, by which the present invention may be non-limited. For example, the light receiving unit can be implemented on a light outputting unit. And, not a single light receiving unit but multiple light receiving units can be implemented on the light processing unit or the light outputting unit. And, one or more light receiving units can be implemented on both the light processing unit and the light outputting unit. The light receiving unit mounted on the wireless power transmission device may have a structure or a shape capable of randomly changing a position of the light receiving unit without being fixed. For example, when the wireless power transmission device is installed, the light receiving unit may fail to perform a function of the light receiving unit due to a structural problem such as a location in which the wireless power transmission device is installed, environment, and the like. In this case, if multiple light receiving units are installed or a location or arrangement of the light receiving unit is changeable, the light receiving unit may properly perform the function of the light receiving unit. Besides, the light receiving unit can be replaced with a separate configuration instead of being installed on the wireless power transmission device.

In the foregoing description, a method of detecting an object using the second laser light reflected and returned to a light receiving unit such as a photodiode and a method of controlling the power of the first laser light have been described. On the other hand, although it is not depicted, it is able to identify a type of an object with reference to data obtained by an image sensor installed in the wireless power transmission device, the wireless reception device, or a camera connected with the wireless power transmission device or the wireless reception device. And, the light controlling unit can control the power of the first laser light in accordance with the type of the identified object. For example, when the data obtained by the image sensor or the like is considered, if the identified object is a living thing such as a human capable of being damaged by the laser light, it may control the power of the laser light. On the other hand, if the identified object is a nonliving thing, it may ignore the detected object.

Figure 17:
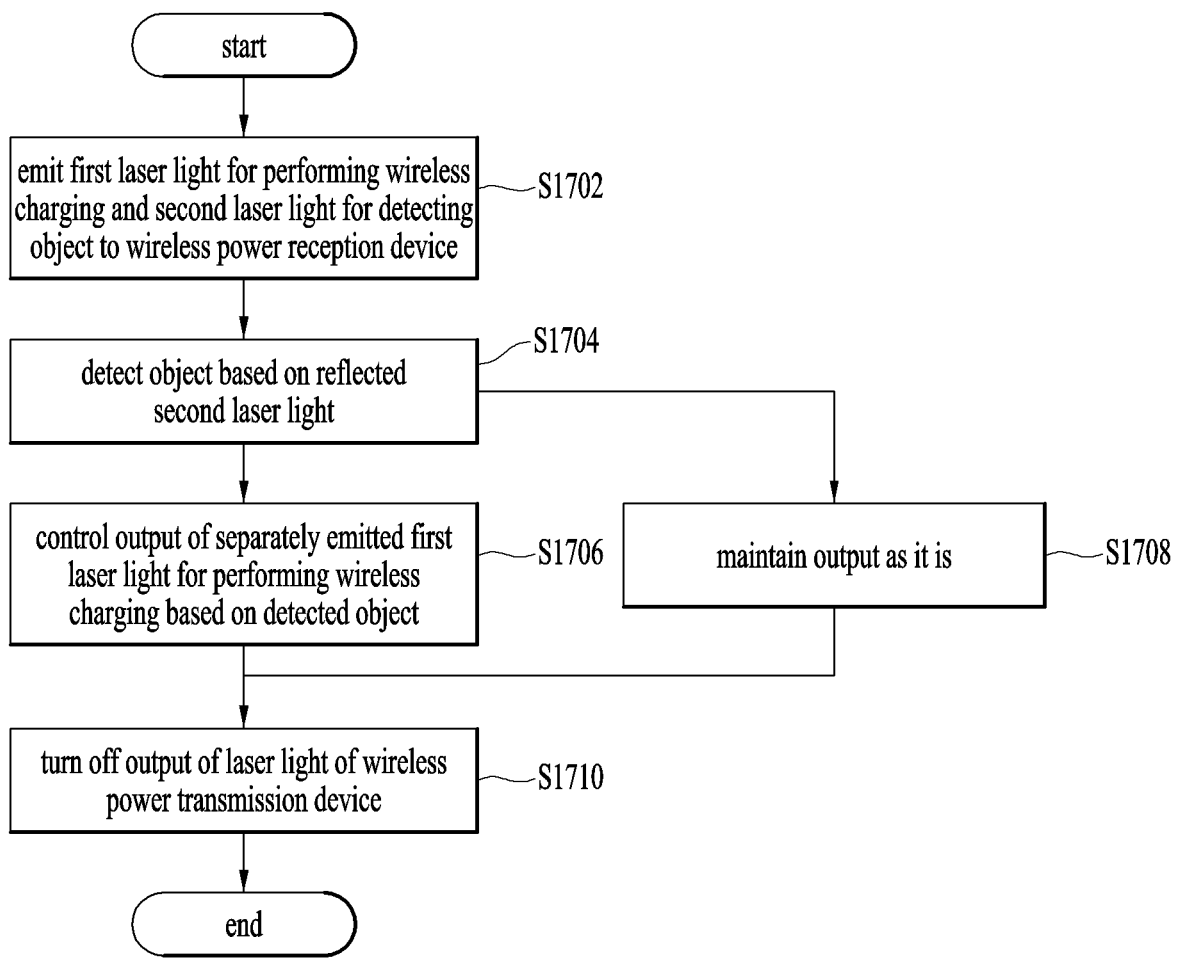
FIG. 17 is a flowchart for explaining a method of controlling power of a light in a wireless power transmission device according to one embodiment of the present invention.

FIG. 17 is a flowchart for explaining a method of controlling power of a light in a wireless power transmission device according to one embodiment of the present invention.

When a laser light is generated in a laser light source, a wireless power transmission device divides the laser light into the first laser light for performing wireless charging and the second laser light for detecting an object and emits the first laser light and the second laser light to a wireless power reception device [S1702].

A light controlling unit of the wireless power transmission device checks whether or not the second laser light is reflected and received via a light receiving unit. If the reflected light is inputted, the light receiving unit reports the light to the light controlling unit. The light controlling unit determines whether or not an object is detected based on the report of the light receiving unit [S1704].

If it is determined that the object is detected based on the result of the step S1704, the light controlling unit controls or maintains the output of the first laser light [S1706/S1708].

When wireless charging is completed, the light controlling unit turns off the output of the first laser light [S1710]. Whether or not the wireless charging is completed can be determined based on the feedback of the wireless power reception device, predetermined wireless power charging reservation time, and the like.

Figure 18:
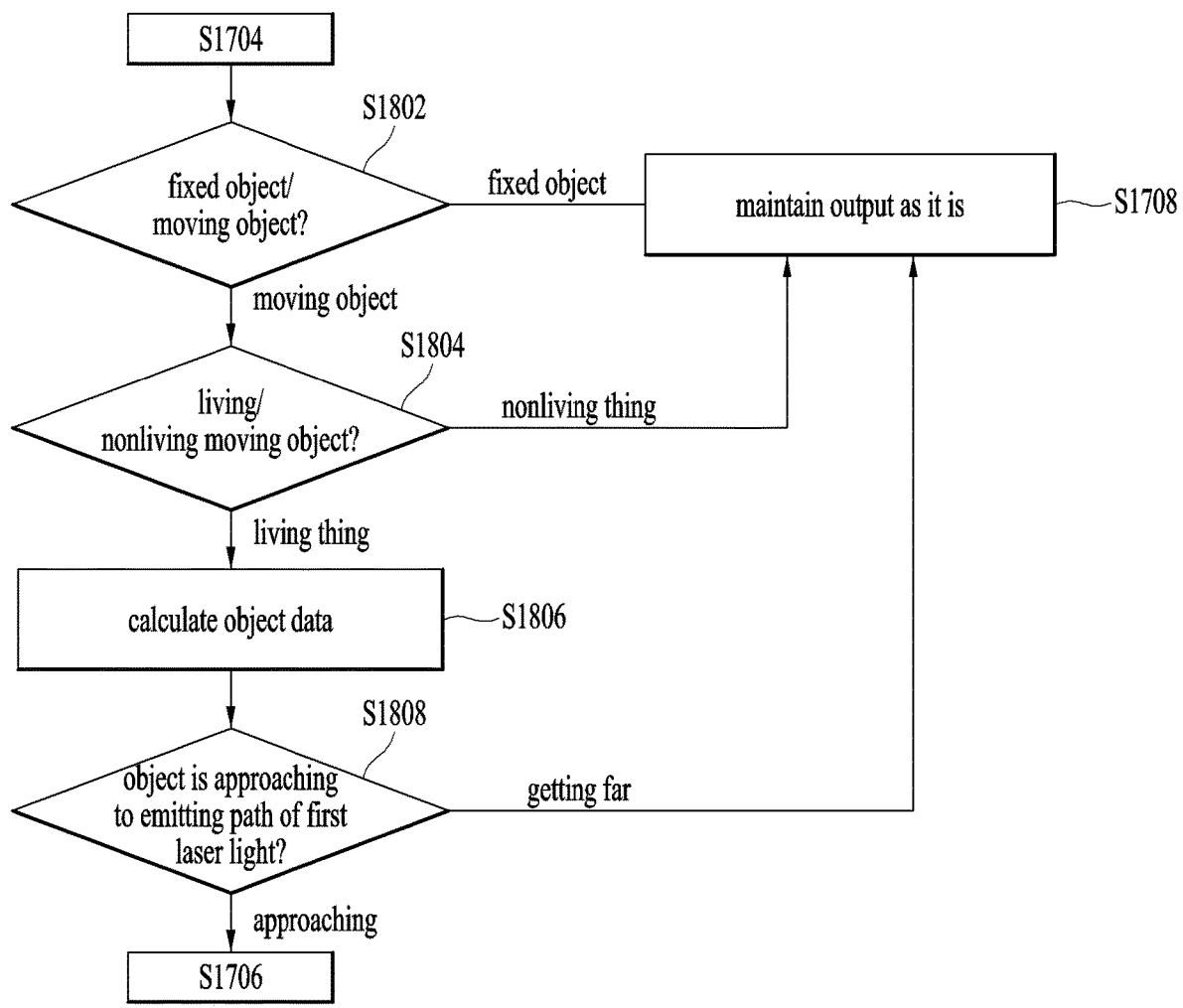
FIG. 18 is a flowchart for explaining a method of controlling power of a light in a wireless power transmission device according to a different embodiment of the present invention.

The steps S1704 to the S1706 are explained in more detail in the following with reference to FIG. 18.

When an object is detected via the step S1704, the light controlling unit determines whether the object corresponds to a fixed object or a moving object [S1802].

If it is determined that the detected object corresponds to a fixed object based on the result of the step S1802, the light controlling unit maintains the output of the first laser light as it is [S1708]. In this case, similar to the step S1808 described later, the light controlling unit may refer to information on whether or not the fixed object is overlapped with an emitting path of the first laser light.

If it is determined that the detected object corresponds to a moving object based on the result of the step S1802, the light controlling unit determines whether the moving object corresponds to a living thing or a nonliving thing [S1804].

If it is determined that the detected moving object corresponds to a nonliving thing based on the result of the step S1804, the light controlling unit maintains the output of the first laser light as it is without changing the output of the first laser light [S1708].

However, if it is determined that the detected moving object corresponds to a living thing based on the result of the step S1804, the light controlling unit controls the output of the first laser light to be changed [S1706]. The output change control may correspond to one selected from the group consisting of temporary output off, output power change, and output angle change.

In this case, the light controlling unit can calculate an object data [S1806]. The light controlling unit can determine whether the detected living moving object approaches to an emitting path of the first laser light based on the calculated object data [S1808].

If it is determined that the detected living moving object is far from the emitting path of the first laser light based on the result of the step S1808, the light controlling unit maintains the previous output as it is [S1708].

However, if it is determined that the detected living moving object is approaching to the emitting path of the first laser light based on the result of the step S1808, the light controlling unit controls the output of the first laser light to be changed [S1706].

If the object is not detected anymore via the reflected laser light received through the light receiving unit, the light controlling unit restores the output of the first laser light to the original output.

As mentioned in the foregoing description, among the separated laser lights, one or more objects can be detected by the laser light for detecting an object in the wireless power transmission process. In the following, for clarity, an example of detecting one object only is explained, by which the present invention may be non-limited. In this case, for example, the detected object may correspond to a fixed object or a moving object. The light controlling unit can determine whether the detected object corresponds to the fixed object or the moving object via a laser light received via the light receiving unit (e.g., photodiode).

Basically, when a laser light is received via the light receiving unit, the light controlling unit can recognize or identify the existence of an object. And, the light controlling unit determines whether the recognized object corresponds to a fixed object or a moving object via the laser light received via the light receiving unit.

For example, if it is determined that an interval of a laser light is constant based on the interval of the laser light received via the light receiving unit, the light controlling unit can determine that a detected object corresponds to a fixed object.

On the contrary, if the interval of the received laser light is shortened or is continuously changing, the light controlling unit can determine that a detected object corresponds to a moving object.

When the detected object corresponds to a fixed object, the light controlling unit can determine whether or not a position of the fixed object is overlapped with an emitting path of the first laser light. For example, whether or not a position of the fixed object is overlapped with an emitting path of the first laser light can be determined via a reference (e.g., reference number, etc.) of an optical fiber for the second laser light which is emitted to detect an object, the first emitting angle, and the like. If the fixed object is not overlapped with the emitting path of the first laser light, the light controlling unit ignores the object and maintains the power of the first laser light as it is. On the other hand, if it is determined that the fixed object is completely or partly overlapped with the emitting path of the first laser light, the light controlling unit can control the output of the first laser light to be turned off or control the emitting angle of the first laser light to be changed.

On the other hand, if it is determined that a detected object corresponds to a moving object and the object corresponds to a living thing, the light controlling unit can determine speed, direction, and the like of the living moving object with reference to an interval of the reflected laser light. For example, the speed may correspond to information indicating the timing at which the living moving object and the emitting path of the first laser light are overlapped, overlap time, and the like. Meanwhile, the direction may correspond to information indicating whether the object is approaching to the emitting path of the first laser light or not.

If it is determined that the detected living moving object is approaching to the emitting path of the first laser light, the light controlling unit can control the output of the first laser light from the timing which is calculated based on the interval of the reflected laser light in consideration of the speed of the object. On the contrary, if it is determined that the detected living moving object is getting far from the emitting path of the first laser light, the light controlling unit maintains the output of the first laser light as it is. In this case, if the output of the first laser light is previously turned off or power is controlled, the light controlling unit can turn on the output of the first laser light or restore the controlled power to the original power.

Meanwhile, the light controlling unit can control the output of the first laser light only when the detected object corresponds to either a moving object or a living moving object.

If it is determined that a moving path of the moving object is overlapped with an output path of the first laser light, the light controlling unit may calculate and use overlap data on a size, thickness, and a moving direction of the moving object.

For example, as mentioned in the foregoing description, if it is assumed that an output end of a light outputting unit, in particular, an output end structure of the second light outputting unit, corresponds to the second laser light using a region (i.e., a region not harmful for a human body) other than FWHM region on a distribution diagram of a laser light for performing wireless charging, an object can be detected using the region. In particular, when the second laser light is emitted to the external via the second light outputting unit, how the second laser light covers the neighboring regions and how much the second laser light covers the neighboring regions are important on the basis of a light path of the first laser light. Although the second laser light is used for detecting an object in a manner of being emitted with a path different from a path of the first laser light, if the second laser light covers a specific region (e.g., a region of a very small range) only on the basis of a light path of the first laser light, it may fail to achieve the purpose of the second laser light. Hence, in order to cover a prescribed range or a prescribed region on the basis of the light path of the first laser light, a light path of the second laser light can be configured in advance or can be configured to be randomly changed at the time of installation. Although an output end structure of the second light outputting unit is not depicted in the present specification, the output end structure of the second light outputting unit can be configured via a random structure. Or, as described in FIG. 16, it may use a random medium.

Meanwhile, in relation to the present invention, changing an emitting angle of the second laser light, detecting an object, controlling a configuration according to object detection, and changing the controlling of the configuration can be displayed in a form of an image, audio, and the like via a display unit (or speaker) mounted on a wireless power transmission or a controller for operating the wireless power transmission device and can be controlled by operating a button on the wireless power transmission device or the controller.

Meanwhile, the light outputting unit illustrated in FIG. 12a can be implemented by various structures or shapes other than the structure shown in the drawing. For example, referring to FIG. 12a, although the first light outputting unit is structurally separated from the second light outputting unit, the first light outputting unit and the second light outputting unit can be formed by a single structure without being separated. To this end, it may use multiple optical fibers for emitting laser light. In this case, a part of the multiple optical fibers is used for detecting an object and another part of the multiple optical fibers can be used for outputting a laser light. By doing so, it may have the same or similar effect. Besides, referring to FIG. 12a, although an output end of the second light outputting unit is depicted and explained as an opening type, the output end of the second light outputting unit may have various structures or shapes. For example, it may be able to control the output end of the second light outputting unit to emit a laser light for detecting an object in accordance with the control of the light controlling unit by implementing the output end of the second light outputting unit with a member capable of being opened and closed. In this case, the member may adopt a material capable of reflecting or absorbing a laser light. And, it may be able to include a member capable of changing an emitting angle of a laser light emitted by an optical fiber in or in the vicinity of at least one optical fiber among one or more optical fibers that construct the second light outputting unit. Besides, it may be able to configure a structure or a shape of the output end of the second light outputting unit to have a closed structure and a hole(s) capable of emitting a laser light. In this case, it is able to control an emitting angle of the laser light emitted via the hole(s) to be changed by changing a size, a height, and the like of the hole(s). Explanation on the structure or the shape of the output end can also be applied to an input end. Or, the output end and the input end can be formed together.

According to at least one embodiment of the present invention, it is able to provide a wireless power transmission device and a method therefor. In this case, the wireless power transmission device can transfer wireless power using a separated laser. It is able to perform wireless charging via wireless power transmission and secure or increase use safety by detecting an object. Moreover, in order to obtain the aforementioned advantages, it is able to provide various types of wireless power transmission device structure.

According to each of the embodiments of the present invention and a combination thereof, it is able to provide a wireless power transmission device and a method therefor, it is able to use a laser corresponding to one of power transfer media by dividing the laser, and it is able to perform wireless charging via wireless power transfer and secure or increase use safety by detecting an object. According to at least one embodiment of the present invention, it is able to propose a structure of a wireless power transmission device capable of performing wireless power transmission and detecting an object using a separated laser.

Those skilled in the art will appreciate that the present invention may be carried out in other specific ways than those set forth herein without departing from the spirit and essential characteristics of the present invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE FOR INVENTION

Various forms for implementing the present invention have been described in the best mode for implementing the present invention.

INDUSTRIAL APPLICABILITY

The present invention relates to a wireless power transmission device and a method therefor and is applicable to various devices including a wearable device and the like. In particular, the present invention is industrially usable.

What is claimed is:

1. A wireless power transmission device, comprising:
a laser light source;
a light outputting unit configured to output a laser light generated in the laser light source by dividing the laser light into a first laser light for performing wireless charging and a second laser light for detecting an object;
a light receiving unit configured to receive the second laser light; and
a light controlling unit configured to control an output of the first laser light via the second laser light received at the light receiving unit.

2. The wireless power transmission device of claim 1, wherein the light controlling unit is configured to determine whether or not an object is detected based on the second laser light received at the light receiving unit.

3. The wireless power transmission device of claim 1, wherein the light outputting unit is configured by containing a first light outputting unit for outputting the first laser light and a second light outputting unit for outputting the second laser light and,
wherein at least one of the first light outputting unit and the second light outputting unit is configured by containing an optical fiber.

4. The wireless power transmission device of claim 3, wherein the second light outputting unit of the light outputting unit is configured by a single optical fiber or multiple optical fibers.

5. The wireless power transmission device of claim 3, further comprising a member configured to change at least one emitting angle of the first laser light and the second laser light emitted from at least one of an output end of the first light outputting unit and an output end of the second light outputting unit.

6. The wireless power transmission device of claim 1, wherein the light controlling unit is configured to determine whether one or more objects detected according to the second laser light received via the light receiving unit correspond to a fixed object or a moving object.

7. The wireless power transmission device of claim 6, wherein if the detected object corresponds to a moving object, the light controlling unit is configured to calculate object data and,
wherein the object data contains data on speed and direction of the moving object.

8. The wireless power transmission device of claim 7, wherein if it is determined as the detected moving object approaches to an emitting path of the first laser light based on the object data, the light controlling unit is configured to control the output of the first laser light to be changed.

9. The wireless power transmission device of claim 1, wherein the light controlling unit is configured to control the output of the first laser light to be changed via at least one selected from the group consisting of changing/restoring an emitting angle of the emitted first laser light, turning off/on output power, and changing/restoring the output power with output power less than a threshold.

10. The wireless power transmission device of claim 1, wherein the first laser light uses a laser light of a FWHM (Full Width at Half-Maximum) region among energy distribution of lasers outputted from the laser source and,
wherein the second laser light uses a laser light corresponding to a region other than the FWHM region.

* * * * *